UNITED STATES PATENT OFFICE.

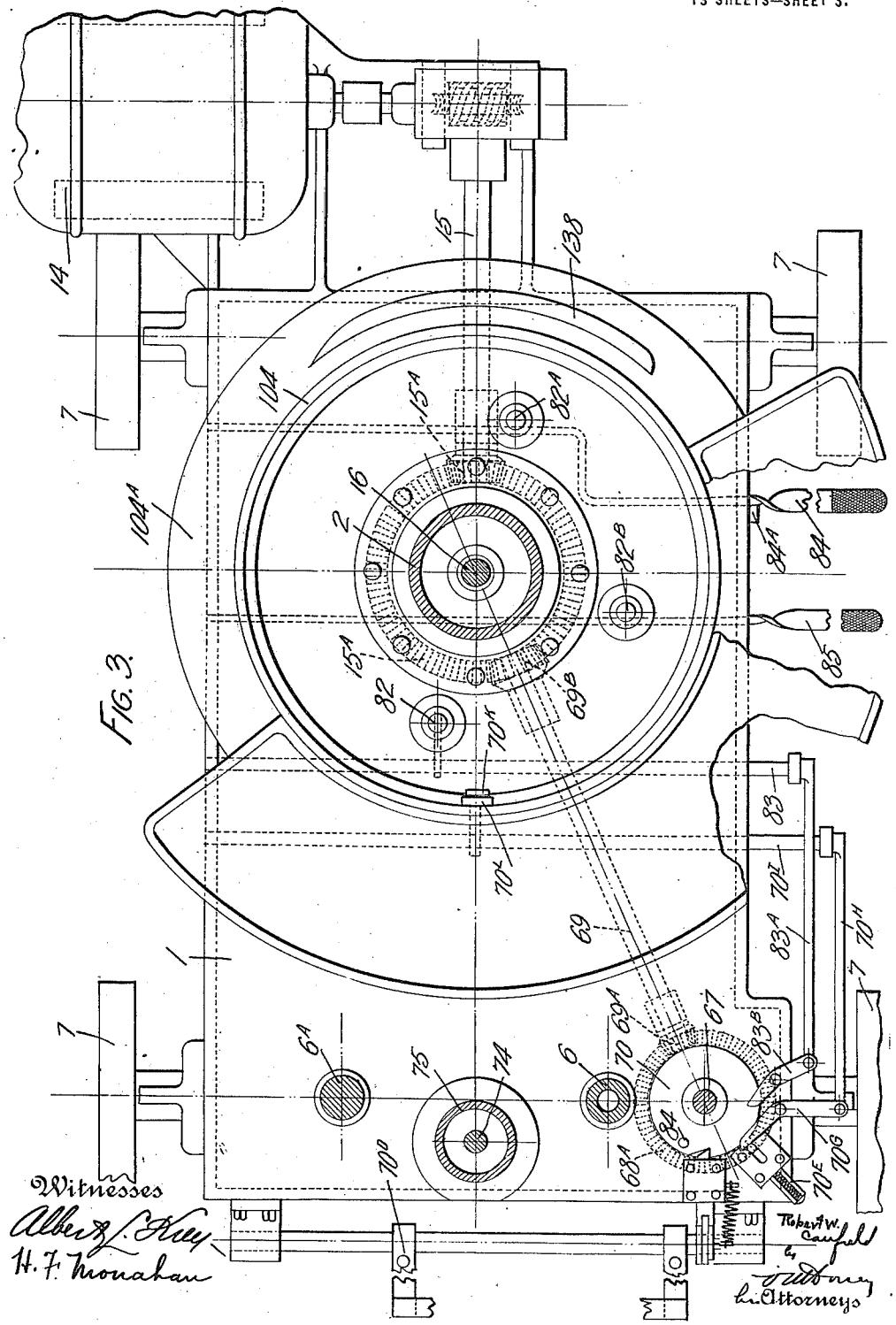

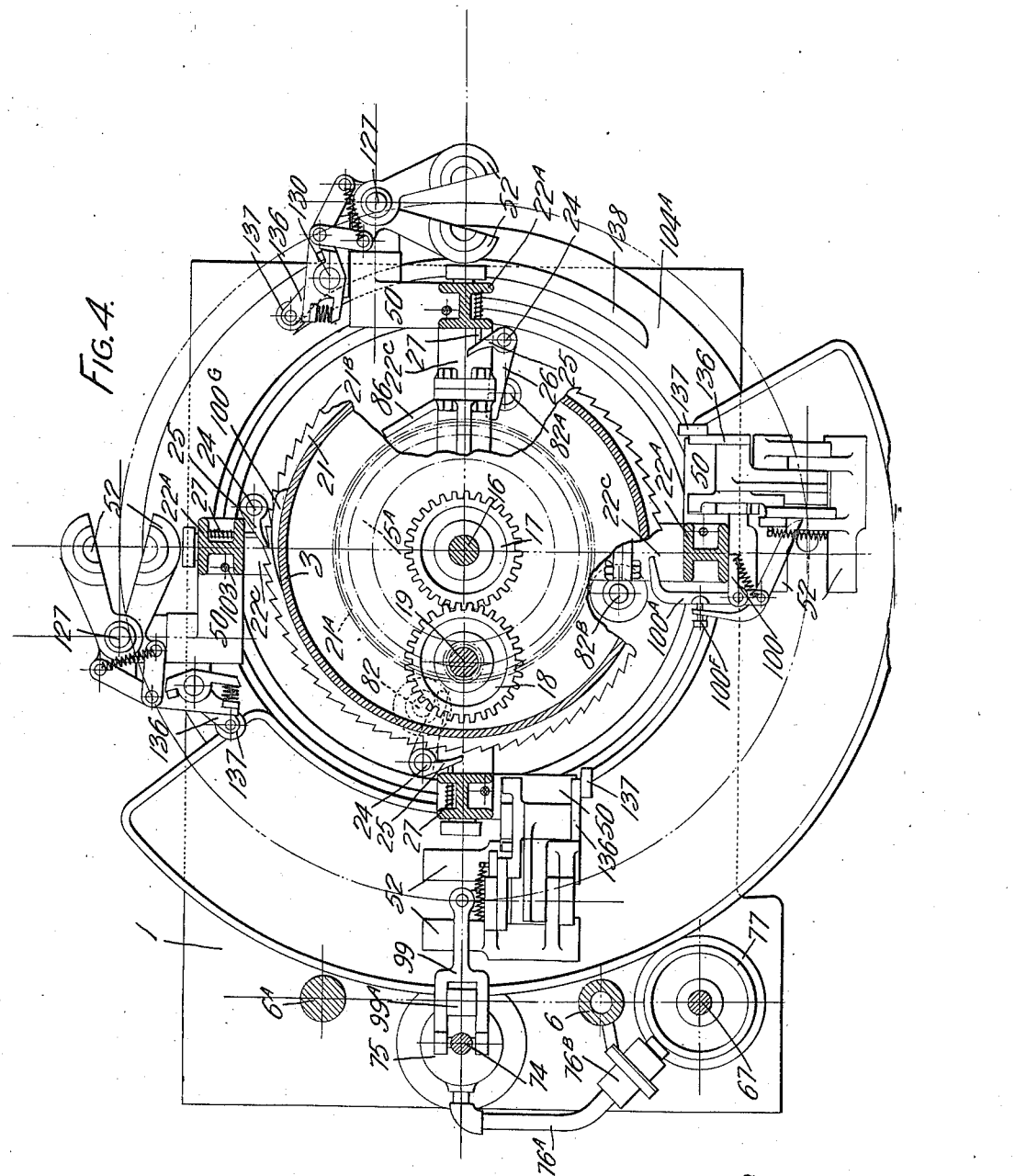

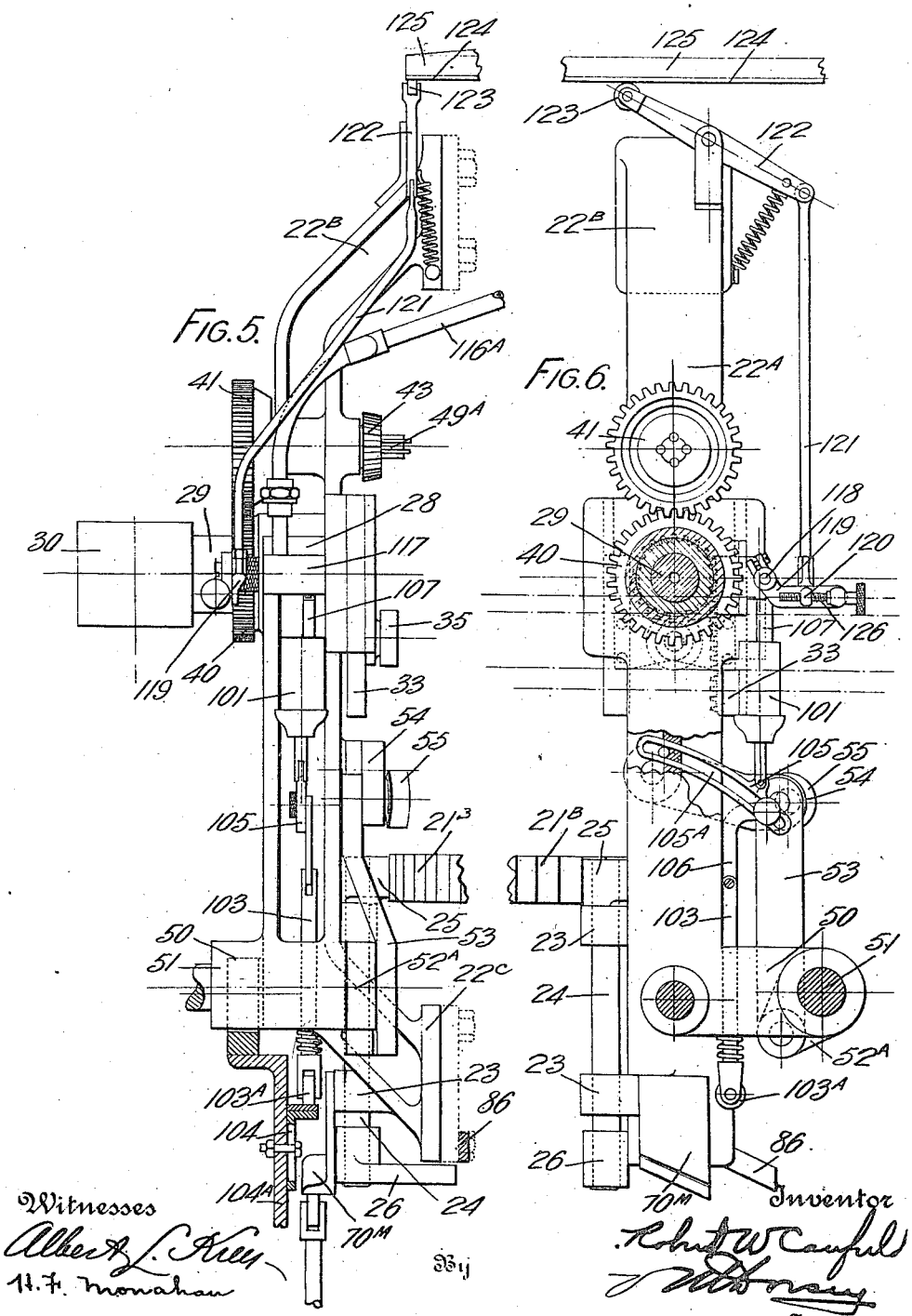

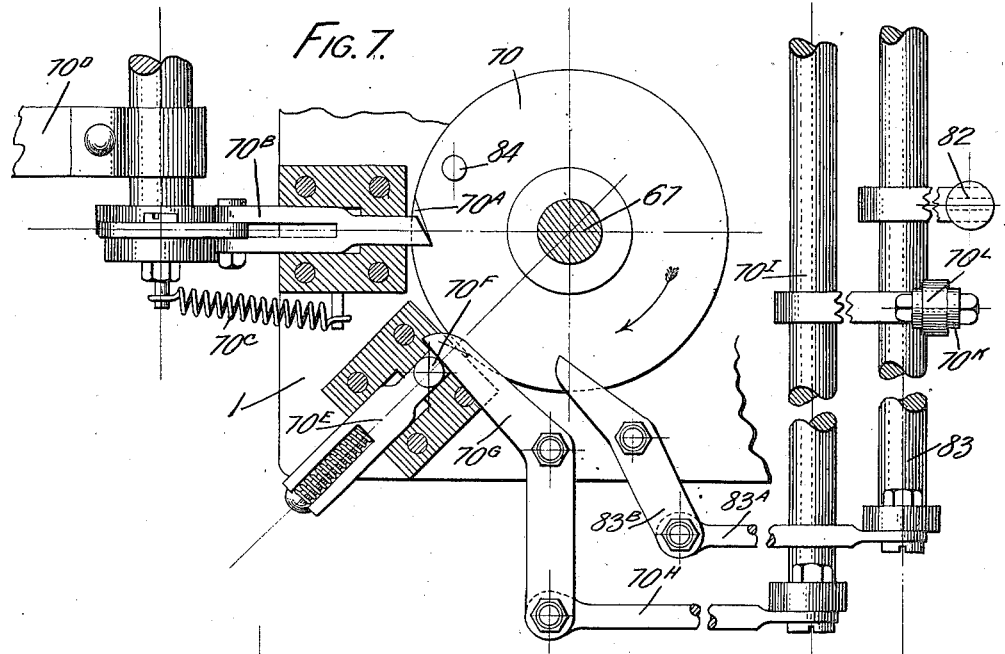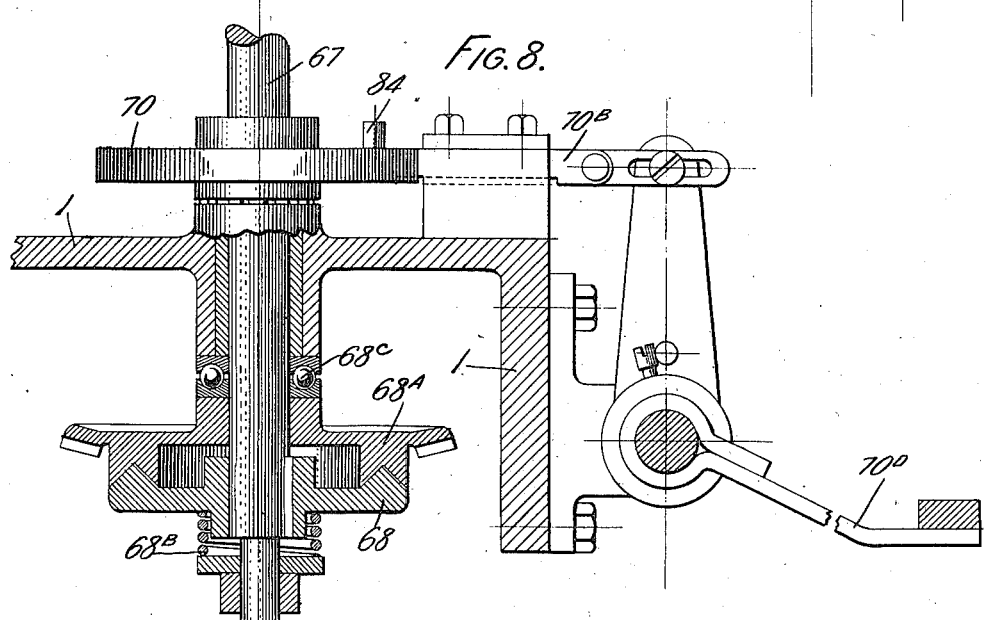

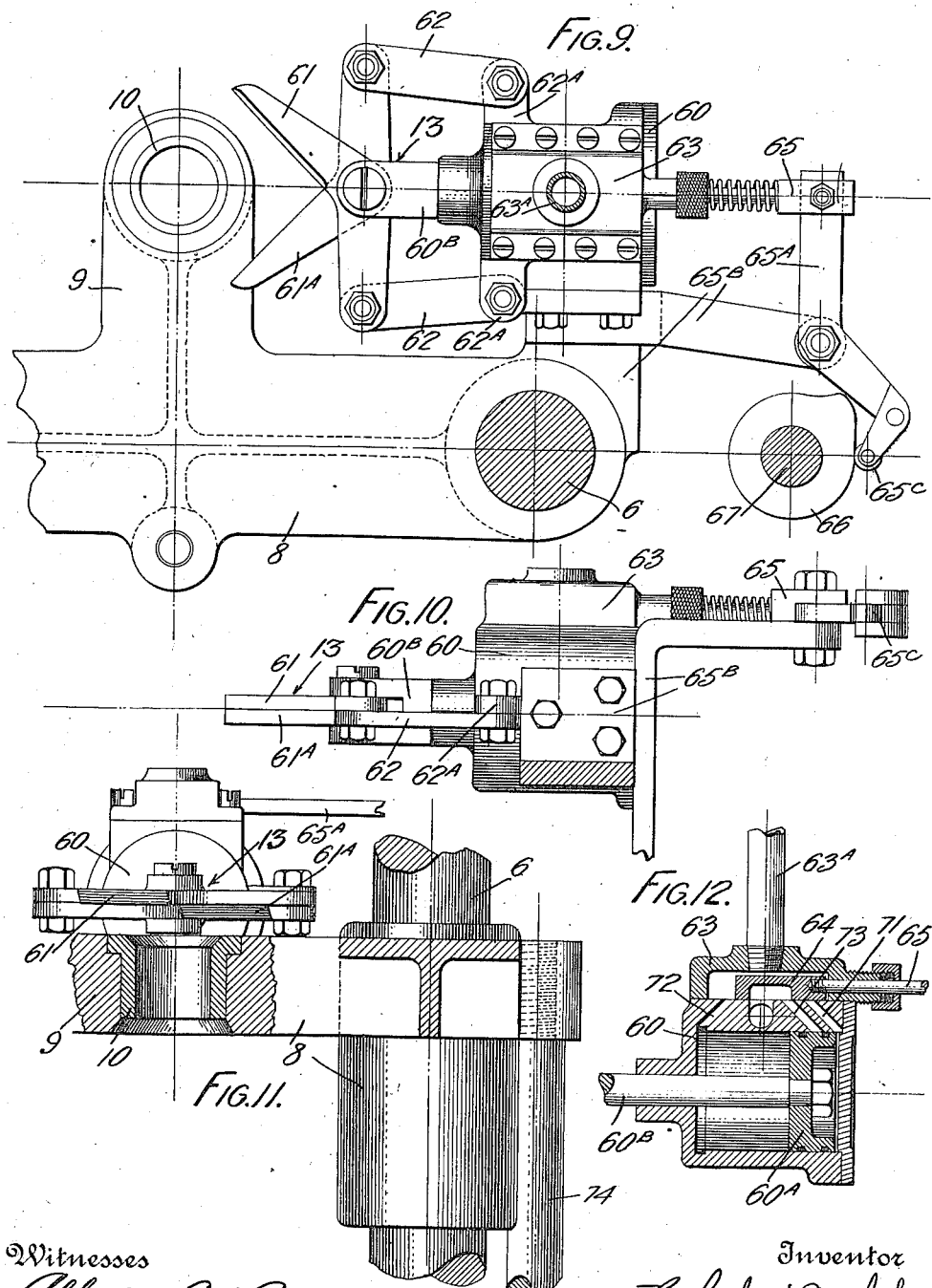

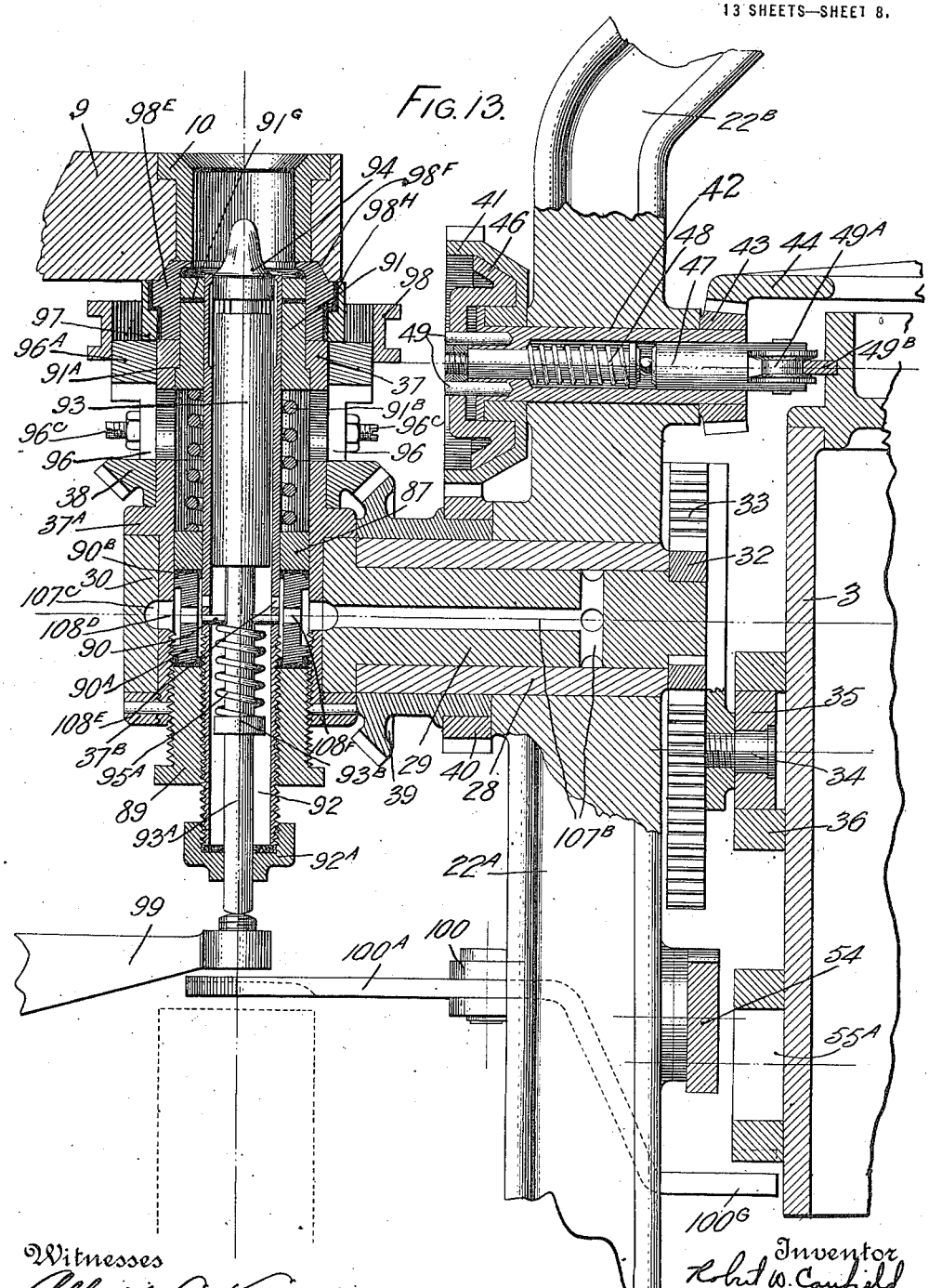

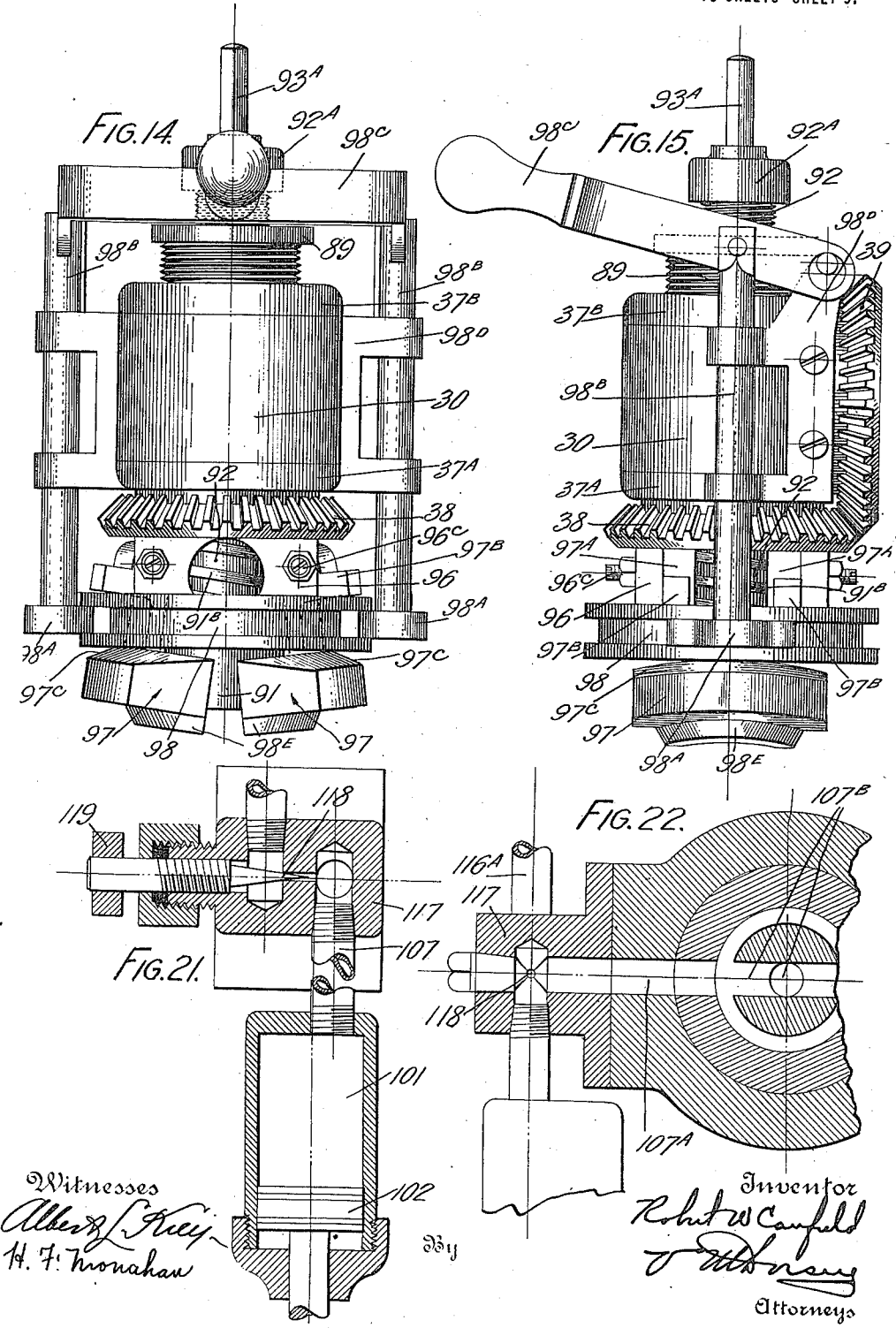

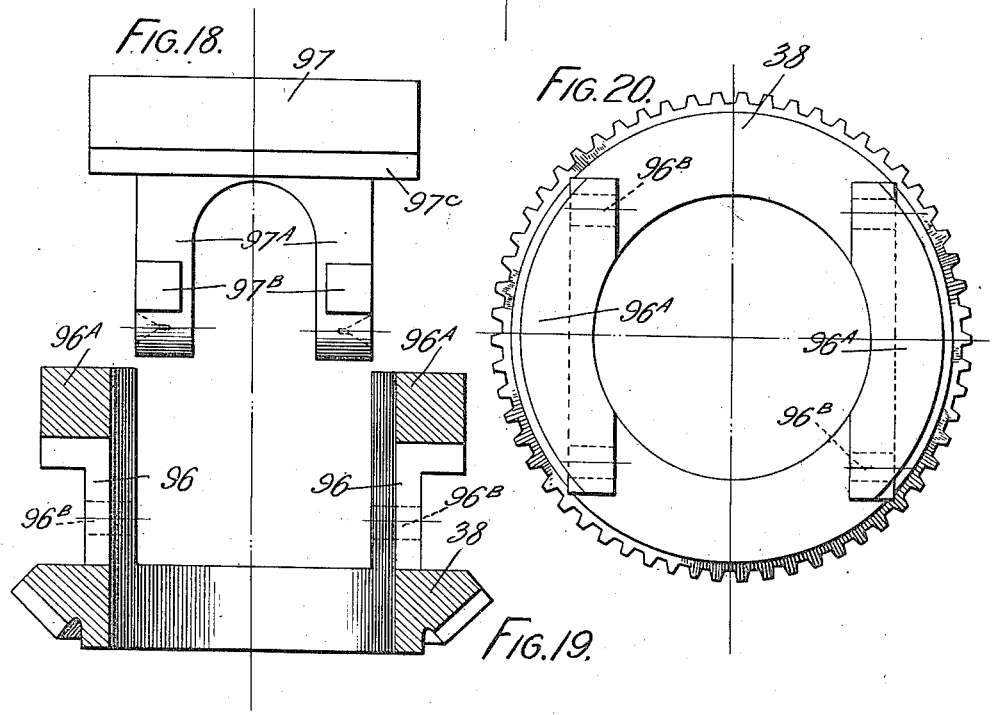

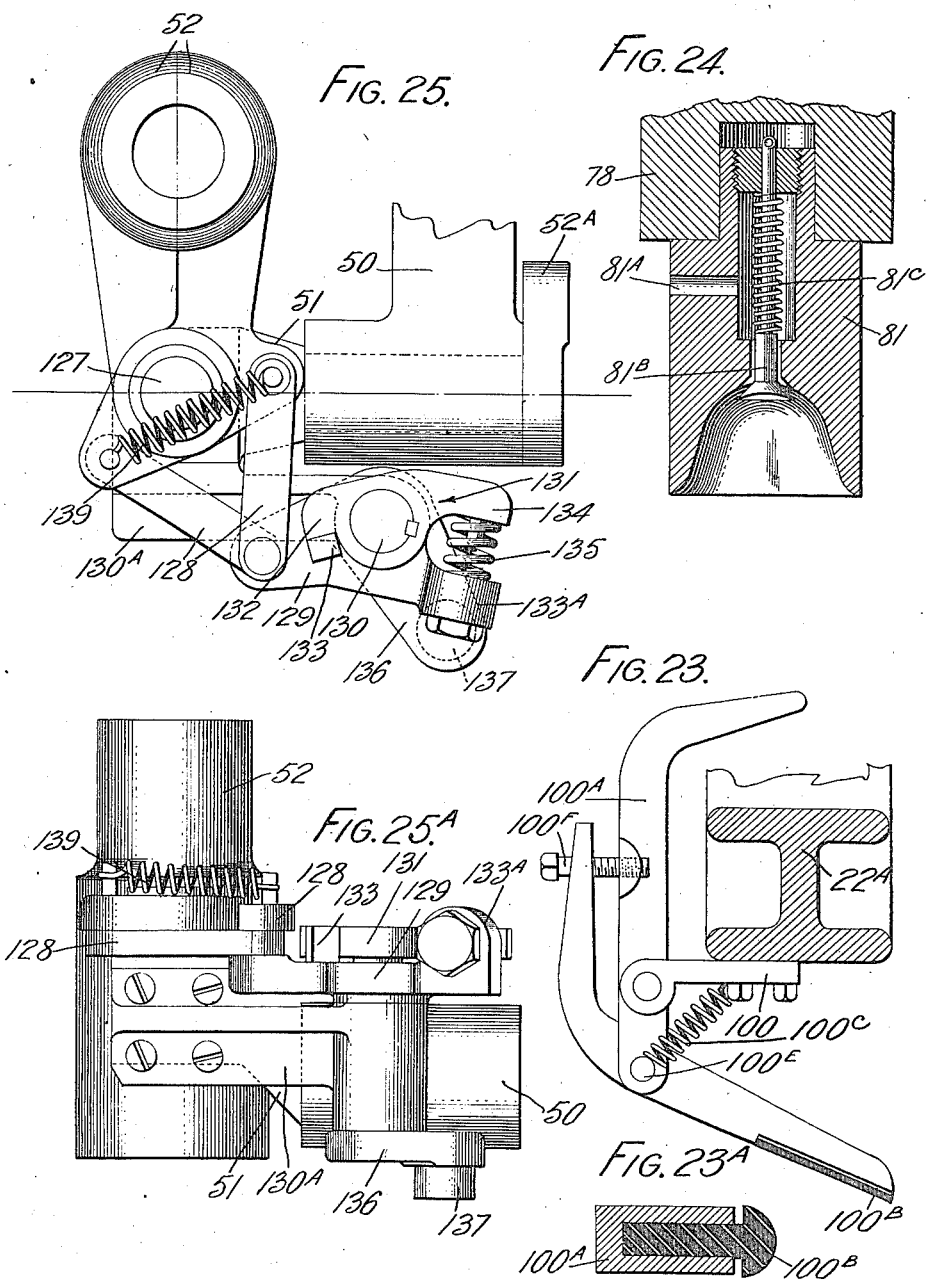

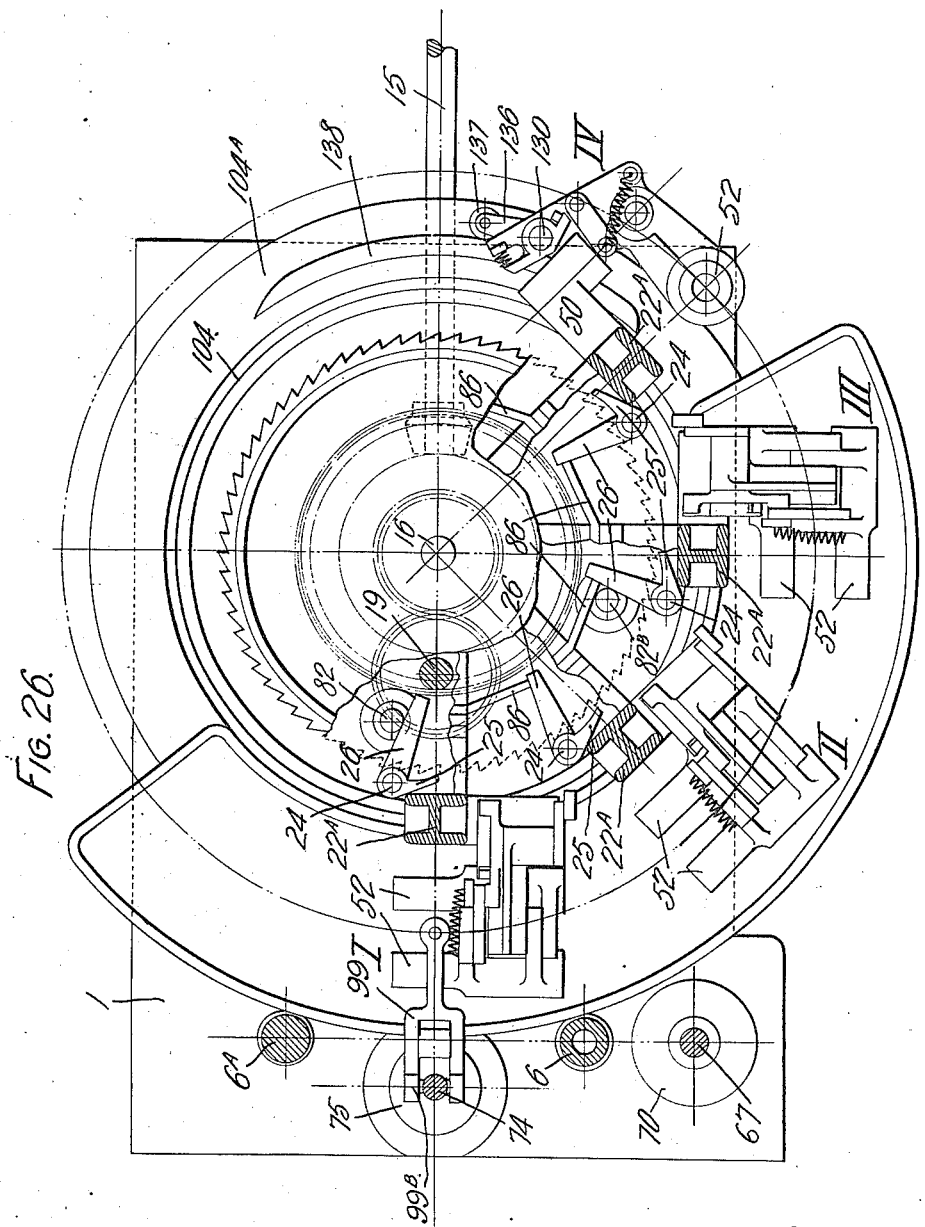

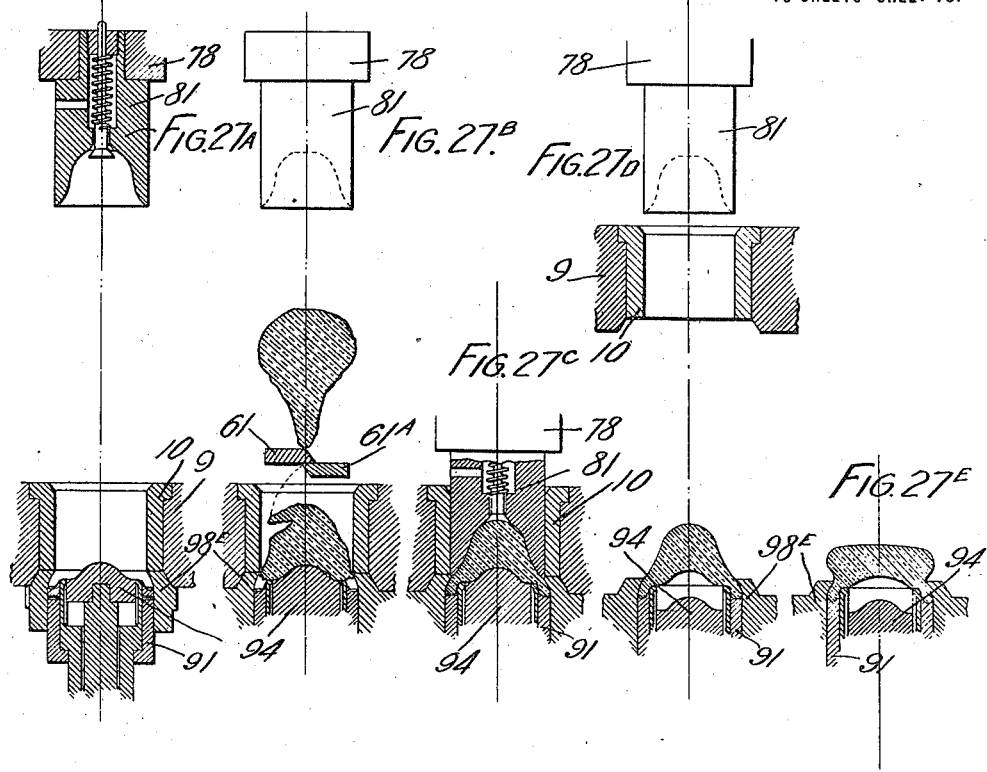
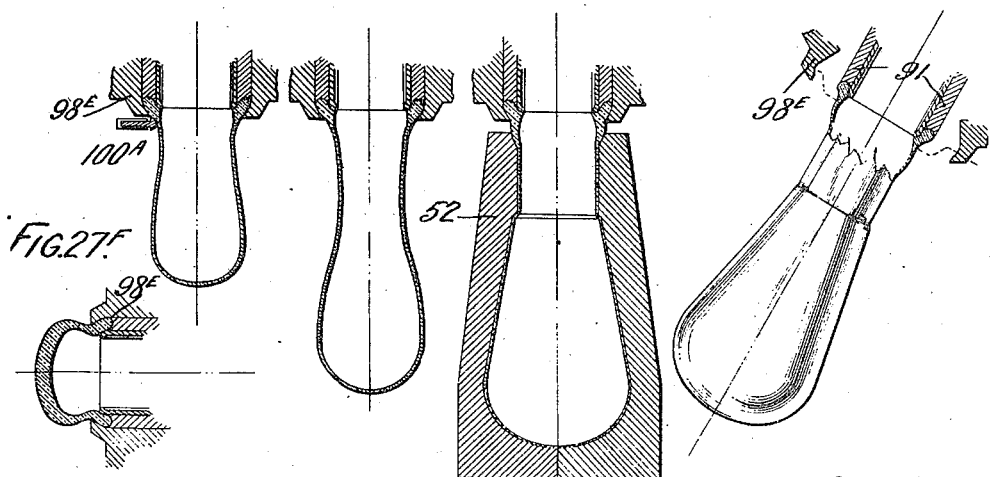

ROBERT W. CANFIELD, OF CORNING, NEW YORK, ASSIGNOR TO EMPIRE MACHINE COMPANY, A CORPORATION OF MAINE.

GLASS-WORKING MACHINE AND PROCESS OF WORKING GLASS.

1,260,637.   Specification of Letters Patent.   Patented Mar. 26, 1918.

Application filed August 20, 1914. Serial No. 857,705.

*To all whom it may concern:*

Be it known that I, ROBERT W. CANFIELD, a citizen of the United States of America, and a resident of Corning, New York, have invented certain new and useful Improvements in Glass-Working Machines and Processes of Working Glass, of which the following is a specification.

This invention relates to a machine for the production of the finer grades of thin hollow glass ware by the press and blow process, the heat contained within the glass at the time of pressing being the best utilized in the final blowing and to processes embodied in such machine.

Attempts have heretofore been made to use the press and blow process, but they have never been successful in so far as concerns the production of extremely thin hollow vessels, such as electric lamp bulbs or the finer grades of tumblers and lamp chimneys. The conditions to be met in the production of this class of goods are exacting. The glass itself must be properly formed into a blank which is homogeneous and has such a distribution of heat to permit its proper expansion and proper flow. Moreover, the blank from which a vessel is to be made must be of definite mass or have a definite mass from which the article is to be formed. Therefore, the difficulties experienced in the manufacture of such vessels by such a process start with the initial formation of the blank. The part to form each blank must be segregated in some way from a mass of glass and I have found that the segregation must be of such a character as prevents the chilling of any portion of the blank in a manner which will become subsequently detrimental in the finished article, or if the segregation does not accomplish this, the blank must subsequently be so treated as will destroy the deleterious effects of such improper segregation. The difficulties in segregating the blank are especially noticeable if it be severed from a stream flowing from a furnace or pontil in such a manner that it is chilled at the point of severance and the chilled portion allowed to become a part of the finished article. The desired quantity of glass having been obtained, it is then, in the process herein described, pressed into a hollow button with comparatively thick walls, and in this step care must be taken that the surface chill imparted to the glass by the button-forming means, while sufficient to form a sack to hold the more fluid interior of the button, be not so great that the subsequent reheating of such surface will reduce the temperature of the button as a whole to below that of proper working.

In the subsequent treatment of the button, and before it is expanded, the surface is allowed to be reheated by conduction from the inner heated mass of glass so that the surface will be sufficiently plastic to expand in the blowing without rupture.

The machine forming the subject-matter of this application has for its object to accomplish the objects above noted and to provide a device which is adapted with the minimum manual control to produce ware of the character specified, although it is obvious that it is capable of producing much coarser articles. For this purpose it consists in a machine hereinafter specified and in the instrumentalities present, many of which are by themselves novel, and as such are claimed *per se*, as will be hereinafter more fully pointed out and claimed.

Referring to the accompanying drawings in which corresponding parts are designated by corresponding marks of reference,—

Fig. 3 is a horizontal section therethrough immediately above the water pan.

Fig. 4 is a corresponding section, the sections through the several units being taken in different parallel planes.

Fig. 5 is a fragmental side elevation of a unit carrier and certain parts carried thereon.

Fig. 6 is a front elevation, partly in section thereof.

Fig. 7 is a plan view partly in section of the starting mechanism.

Fig. 8 is a side view thereof partly in section showing also the friction drive for the starting shaft.

Fig. 9 is a top plan view of the glass cutting mechanism and its mounting.

Fig. 10 is a side elevation thereof.

Fig. 11 is a view partly in section of the cutting mechanism and the ring block.

Fig. 12 is a section through the air cylinder of the shearing mechanism.

Fig. 13 is an enlarged vertical section through the glass-carrying spindle and its mounting and parts associated therewith, while in loading position.

Fig. 14 is a front elevation of the glass-carrying spindle.

Fig. 15 is a side view thereof.

Fig. 16 is a side view of the neck-ring carrier.

Fig. 17 is a section through the driving gear and mounting of the neck ring carrier.

Figs. 18 and 19 are views similar to Figs. 16 and 17, but taken at right angles thereto.

Fig. 20 is a plan view of the gear shown in Figs. 16 and 18.

Fig. 21 is a sectional view showing the main air valve and puff cylinder.

Fig. 22 is a section at right angles thereto.

Fig. 23 is a detail view of the necker.

Figure 1:
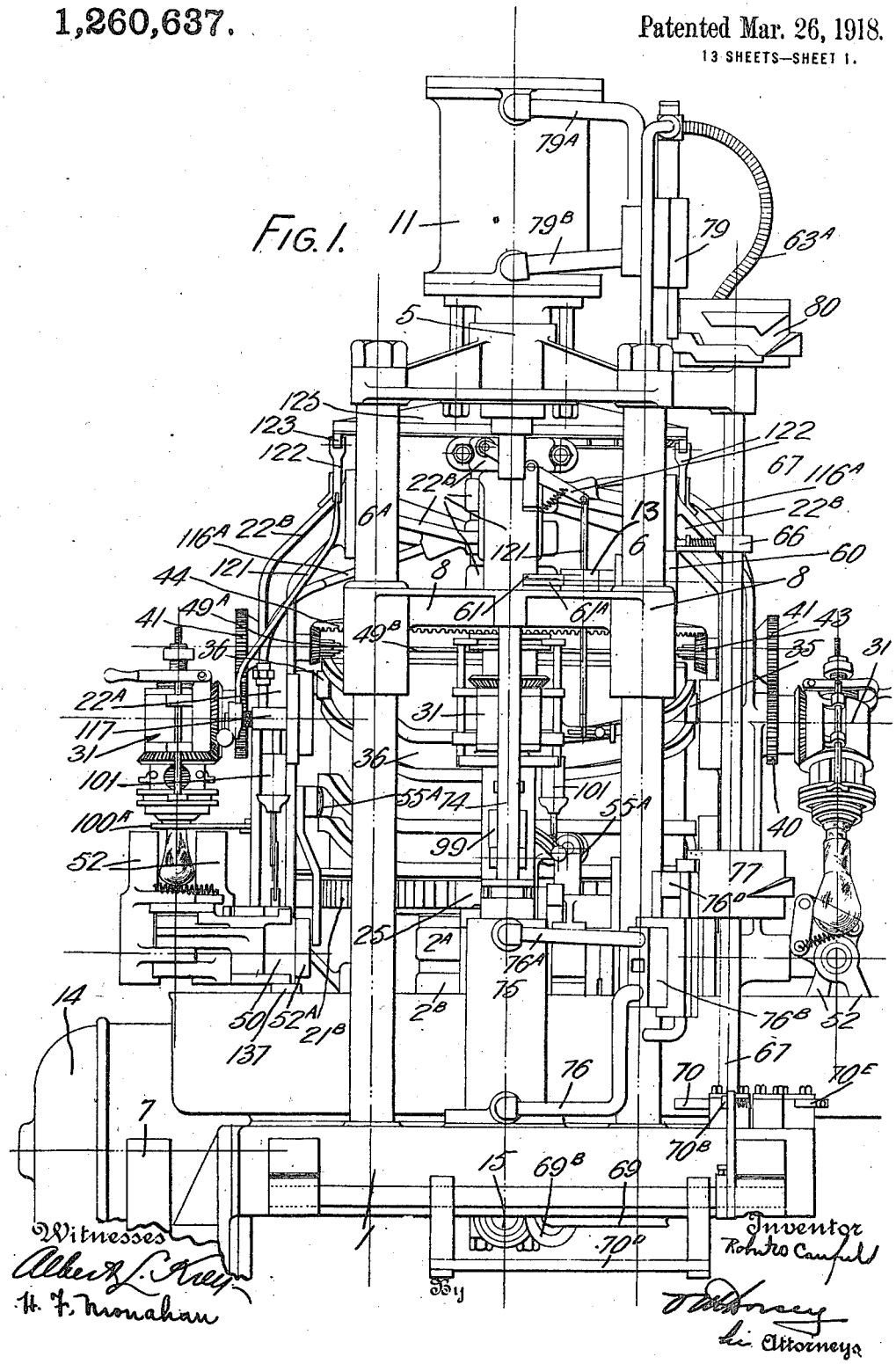
Figure 1 is an elevation of a machine embodying my invention, looking at the loading side thereof.

Fig. 23ª is a cross section thereof.

Fig. 24 is a detail view of the external plunger.

Fig. 25 is a top plan view of the mold mechanism.

Fig. 25ª is an elevation thereof.

Fig. 26 is a view illustrating my machine with the four units thereof bunched.

Figs. 27ª, 27ᵇ 27ᶜ, etc., are series of positional views illustrating the formation by the machine of a bulb for the lamp known as S 19.

Generally speaking, the machine herein disclosed comprises a glass-severing and pressing device, the latter of which is adapted to form a button of glass upon the end of a glass-carrying spindle, of means for swelling such button after a proper interval to permit the reheating of its surface, of means for moving such spindle with the glass thereon away from the forming device and presenting it to a mold, with a retardation of the spindle in a substantially horizontal position while the spindle is rotating around its longitudinal axis, whereby the glass while being expanded is prevented from unequal flow, and of a mold mechanism co-operating with a blowing mechanism to finish the blank after the latter has elongated after the spindle is in vertical position.

In the form of machine shown herein a single severing and pressing mechanism is employed, with which latter mechanism a series of units, each comprising a glass carrying mechanism, a glass blowing mechanism and a mold mechanism co-act, the glass carrying mechanism of each unit being adapted to co-act in succession with the severing and pressing mechanisms. The units above referred to, while they are driven from a common source of power, are each independently movable in respect to each other in a common path, and are each intermittently arrested at points in such path for certain purposes, the period of arrest at such points being if desired subject to the will of the operator, but without in any way affecting the movement of the other units. From this construction it follows that no unit need be arrested while another is stationary. This gives great flexibility to the machine in that the masses to be stopped and put in motion are each small and capable of being easily arrested and moved, and in that the time required for a unit to complete its own cycle movements is merely determined by the necessity of that unit and not by the necessities of other units with which it may be associated. In the embodiment shown these units take the form of a series of carriers independently movable around a central standard with periods of rest for certain purposes, namely, to have the blank pressed thereon, to permit, if necessary, time for elongation of the blank and finally upon the completion of the cycle of the forming operation. In this way there exists no occasion for making the charging period of one unit coincident or identical with the elongation period of another unit, and, furthermore, in case the operators do not present the flowing stream to the mold in periods equal to the natural period of the machine, but in periods slightly in excess thereof, they are not required to permit one unit to pass the charging point, and to wait until the arrival of another unit at that point. Thus the units are movable intermittently around the standard, and in respect to each other and independently of each other.

In the drawings the machine is shown as consisting of a base 1, supporting a tubular central column 2, carrying a stationary cam drum 3, from the head of which arises an upper tubular column 4 which is braced at its upper end by an arm 5, carried by the guide standards 6, 6ª, arising from one end of the base. The base itself may obviously be mounted upon wheels 7, by which the machine may be transferred from furnace to furnace.

On the guide standards 6, 6ª, is slidably carried a cross-head 8, which has projecting therefrom, toward the central column of the machine, an arm 9, in which is carried the glass receiver 10, having an open top and bottom. Mounted on the head 5 immediately above the receiver is the pressing air cylinder 11, the piston head of which is carried on the upper end of a piston rod, the latter having a press plunger thereon. Located between the plunger and the glass receiver is a glass shearing mechanism 13.

The parts above described are non-rotating parts. With them and their actuating mechanism are associated the traveling units, and inasmuch as all of these units are of similar construction and derive their motion from the same source it will be sufficient to describe one of them in detail.

Mounted on the base is a suitable motor 14, (by preference electric), which drives through the horizontal shaft 15, beveled gearing 15ª, and vertical shaft 16 (the latter mounted within the lower column), the pinion 17, mounted upon the upper end of the last named shaft, which pinion in turn meshes with a gear 18, mounted upon the shaft 19 journaled in the bottom of the cam drum 3 and projecting therethrough, and having upon its lower end, below the bottom of the drum, a pinion 20 meshing with the internal gear 21ª upon the gear wheel 21, which latter is sleeved on the upper end of the lower column 2 and which has thereon external ratchet teeth 21ᵇ.

Figure 2:
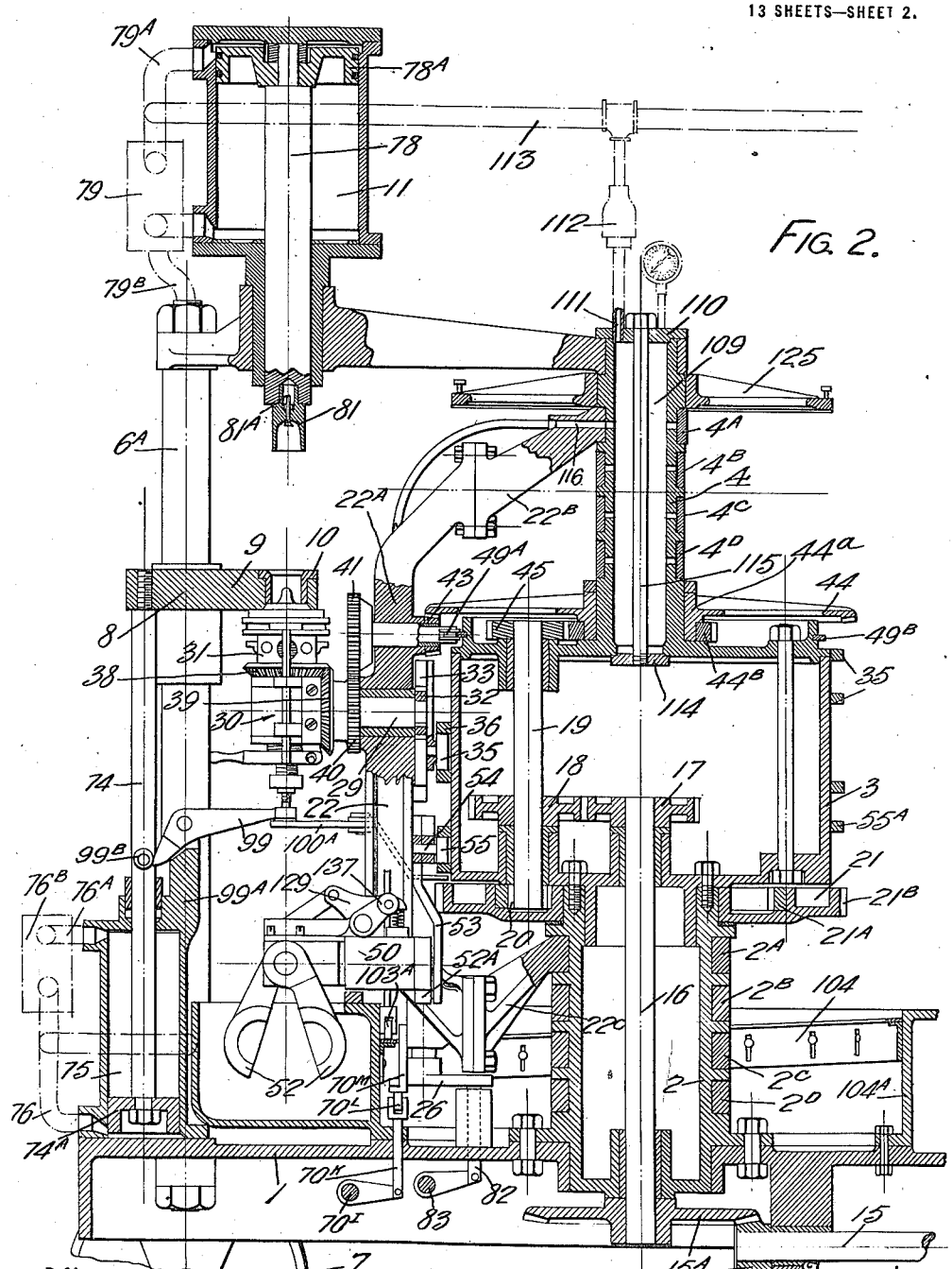
Fig. 2 is a vertical section therethrough, taken through loading position.

The lower and upper columns 2 and 4 are each provided with a series of circumferential grooves 2ª, 2ᵇ, 2ᶜ and 2ᵈ and 4ª, 4ᵇ, 4ᶜ, 4ᵈ, separated by annular flanges, each groove forming a bearing, and in the corresponding bearings of the upper and lower columns are journaled the upper and lower ends of the several unit carriers 22. In Fig. 2 in which only one unit is shown, it is the upper bearing of each column that is shown so occupied.

The carriers each consist of vertical intermediate portions 22ª and upper and lower inclined end portions 22ᵇ, 22ᶜ, which latter are journaled upon the bearings hereinbefore referred to, the inwardly extending projection of such end portions being sufficiently great to locate the central portions 22ª of the carriers upon the outside of the cam drum, around which such carriers may therefore rotate. Upon these carriers the several glass working instrumentalities of the several units are carried.

Carried in suitable bearings 23 near the base of the vertical portion 22ª of each carrier 22 is a vertical shaft 24 mounted for rotative movement, and having rigid upon its upper end a dog 25 adapted to engage the external ratchet teeth 21ᵇ, the lower end of the shaft having a tappet arm 26 projecting inwardly therefrom, the dog being normally thrown to engage the ratchet teeth by a spring-pressed rod 27 bearing upon such dog and guided within the web of the carrier. When the dog is so engaged with the ratchet teeth the carrier upon which such dog is mounted will move in unison with the wheel 21 and thus revolve around the central columns and the cam drum.

The central portion of the carrier has a horizontal bearing 28 therein and projecting from the face thereof, and through such bearing projects the trunnion 29 of the spindle-carrying cross-head 30, such cross-head having a bearing therein at right angles to the trunnion, in which bearing is mounted the tubular glass-working spindle 31. The trunnion has fast on its rear end, that is, on the inner face of the central section of the carrier, a pinion 32 meshing with a rack bar 33 mounted for vertical movement in guides on the inner face of such carrier, the rack bar having projecting from the inner face thereof a stud 34 upon which is mounted a roller 35 running in a peripheral cam 36 on the face of the cam drum 3, the cam being so formed as to oscillate the spindle-carrying cross-head around its horizontal axis formed by the trunnion, in the manner to be hereinafter described. It may be briefly stated, however, that the function of the cam is to invert the spindle from a vertical position to a position of 180° therefrom, to hold the spindle in these positions, and also to hold the spindle in certain intermediate positions.

The spindle consists of several pieces, among others of a sleeve 37 mounted in the transverse bearing in the cross-head, and having fast thereon, above the cross-head, a beveled gear 38 meshing with a beveled driving pinion 39, which is sleeved on the projecting end of the bearing 28 and which has fast thereto a gear 40. The gear 40 meshes with a pinion 41 sleeved on a tubular shaft 42, projecting through the central section of the carrier above the bearing 28. The rear end of the shaft 42 projects through to the rear face of the carrier and has fast thereon a beveled gear 43, meshing with a beveled wheel 44, sleeved on a boss 44ª formed on the top of the cam drum 3. Fast to the hub of the wheel 44 is a gear 44ᵇ meshing with a pinion 45 fast upon the upper end of the shaft 19 before referred to and driven from the motor by the gears 17 and 18. The gear 41 forms one element of a cone friction clutch, the opposite element of which is a cone 46, carried by a rod 47, contained within the tubular shaft 42 and spring-pressed by the spring 48 to cause the member 46 to press upon the internal face of the gear 41, the member 46 being caused to rotate in unison with the tubular shaft 42 by means of drive pins 49 on the end of such shaft and projecting through suitable apertures in the hub of the member 46. The rod 47 is formed in two pieces with an interposed ball bearing between them to permit the outer end of the rod which carries the cone to rotate without rotation of the inner end of the rod. The inner end of the clutch rod 47 carries an anti-friction roller 49ª running upon a circumferential cam ring 49ᵇ mounted upon the head of the cam disk 3, the contour of this cam ring being such that at times the clutch rod is pushed outwardly through the tubular shaft, thus disengaging the clutch members and arresting the rotation which would otherwise be imparted through such clutch to the spindle from the gear 41. The direction or drive of the gear 41 from the motor is such that the rotation imparted to the spindle by the rotation of the wheel 41 is in the same direction as the rotation which is imparted to the spindle due to the movement of the carrier as a whole around the drum.

On the lower end of each carrier is a bearing 50 projecting to one side of the carrier, through which bearing projects the horizontal shaft 51, carrying on its outer end the mold parts 52, the center of the mold being to one side of the axis of the shaft. The inner end of the mold-carrying shaft projects to the inside of the bearing 50 and has a crank arm 52ᵃ thereon, to which is attached the lower end of a vertical link 53, to the upper end of which is attached one end of a radius bar 54, the other end of which is pivoted on the central section of the carrier. A roller 55 is carried on the rear face of the link 53 and works in a mold lifting cam run 55ᵃ, on the cam drum, such cam being so shaped that in the movement of the carrier around the drum the mold shaft will be oscillated, at times lift the mold and cause the mold cavity therein to be vertical and in alinement with the blow-pipe spindle and at other times causing the mold cavity to be horizontal. At the latter time by reason of the fact that the axis of the mold cavity is off-set from the axis of the mold-carrying shaft 51 the mold will be lowered and be within a water tank 52 formed on the base of the machine.

Mounted upon each carrier intermediate of the spindle bearing 28, and the mold-bearing 50, is a necker hereinafter described which is pivoted for movement to and from the position occupied by the blow-pipe when the same is in position to permit elongation of the blank. The necker is normally out of contact with any glass carried by such spindle, but is adapted to be moved into contact therewith in the rotation of the carrier.

The above is a general statement of the construction of the machine, which is so arranged that in its operation a mass of glass is cut by the shearing mechanisms from a stream fed in any suitable way, either from a furnace or from a pontil, into the glass receiver, beneath which the glass-carrying spindle is positioned, is pressed in such receiver into a blank by the pressing mechanism and affixed to a suitable neck ring on the carrying spindle. The glass receiver is then lifted, leaving the glass in the neck ring on the spindle, which is subsequently put in motion around the central standard and rotated around its longitudinal axis. Air is introduced to slightly swell the blank. The spindle is then moved on its horizontal axis until it is in a substantially horizontal position where its rotation neutralizes the effects of gravity upon the heated glass and is retarded in this position a sufficient length of time to permit the swelling of the blank. The spindle is then further removed on its horizontal axis until it is vertical with the neck ring downwardly, at which time the translatory movement of the carrier may be arrested and the carrier becomes stationary, if elongation has not taken place with sufficient rapidity. If arrested, the carrier again starts its translatory movement after the blank has sufficiently elongated, and during this further movement of the carrier air is admitted into the blank carried by the spindle and the mold is closed and an article blown, after which the mold is opened and lowered, and the spindle swings up with the bulb thereon and the carrier again comes to rest, to be again placed, in its turn, beneath glass-receiver. The details of construction of the several parts and of the mechanisms by which these movements are accomplished will now be described.

*The glass-severing mechanism.*—Mounted on an arm projecting inwardly from one end of the cross-head 8 is an air-cylinder 60 in which is mounted a piston head 60ᵃ and rod 60ᵇ. The glass cutters comprise two pivoted members 61, 61ᵃ each of substantially L-form, which are pivoted together at their elbows and to the forward end of the piston-rod, one arm of each member forming a cutter, while the outer end of the opposite arms of such members are connected by links 62 to ears 62ᵃ formed on the air cylinder. Thus the severing mechanism comprises a toggle joint, actuated by the piston in such manner that upon the outward movement of the piston the cutters are projected with the piston and are also closed upon each other. When so projected and closed they pass the axial line of, and above, the glass-receiver, thereby severing any stream of glass flowing into such receiver. As shown, the lower one 61ᵃ of these cutting blades has but a slightly beveled face, and as will be described, acts upon the upper end of the severing part of the glass to carry such end to one side of the axial line of glass receiver.

Mounted above the air-cylinder 60 is the valve-chest 63 to which air pressure is supplied through the supply-pipe 63ᵃ. The chest contains a slide valve 64 actuated by a valve stem 65, which latter is pivoted to one end of a lever 65ᵃ mounted in a projecting bearing 65ᵇ from the cross head, and having upon its opposite end a roller 65ᶜ working on the face of the cam 66 carried by a vertical shaft 67 mounted in bearings in the head 5, and in the base of the machine. This shaft, below the base, has mounted thereon, one member 68, of a friction clutch which is pressed toward the other member 68ª, which is a beveled gear, by a spring 68ᵇ. The beveled gear member, 68ª, is sleeved on the lower end of the shaft, and the end thrust thereof, is taken up by the ball-bearings 68ᶜ, it being driven by a beveled gear 69ª on a horizontal shaft 69 driven through a second beveled gear 69ᵇ fast thereon, and meshing with one of the beveled gears 15ª driven from the main motor. From this construction, it follows that the vertical shaft 67 is driven through a friction clutch, it being capable of being held against rotation, the clutch members sliding on each other at such time. For the purpose of thus holding the shaft against rotation, the shaft has thereon a disk 70 having a notch 70ª therein in which is adapted to engage a bolt 70ᵇ, normally held against such disk by means of a spring 70ᶜ and adapted to be withdrawn from such disk by the foot lever 70ᵈ.

A second bolt 70ᵉ, which is spring-pressed, is also provided, adapted to engage the notch 70ª, in a position slightly in angular advance of that in which it is engaged by the bolt 70ᵇ, such bolt 70ᵉ having a pin 70ᶠ thereon adapted to be engaged for the retraction of the bolt by a lever 70ᵍ connected through a link 70ʰ and a crank shaft 70ⁱ with a vertical push rod 70ᵏ, carrying near the base of a machine a tappet roller 70ˡ, which is adapted to be depressed by a beveled lug 70ᵐ depending from each unit-carrier, as such carrier moves into loading position, whereby the bolt 70ᵉ will be retracted at such time.

On depressing the lever 70ᵈ, the bolt 70ᵇ is withdrawn from the notch in the disk, and the shaft 67 is frictionally driven, rotating the cam 66 and shifting the valve 64 to admit air into the severing cylinder to project the piston thereof and sever the glass. The parts are so proportioned, and the air pressure is such that under these conditions, the cutters close quickly and with considerable velocity, and to such extent that the upper end of the severed mass of glass has not sufficient time to fall away from the lower blade before its upper end is thrown to one side, whereby it is caused to fall, not into the center of the glass-receiver (which would locate the cut end at the bottom of the finished bulb), but to one side of such center, where it will be worked into the mass of glass when the latter is pressed, and where it is more subject to re-heating from the heat of the mass, and where it is less detrimental. Upon the lifting portion of the cam 66, passing from under the valve lever, the valve is shifted to its original position, and air pressure is admitted to the opposite end of the cylinder, thus retracting the piston. For the purpose of cushioning the inward stroke of the piston, at which time no work is being done in severing glass, I provide a supplemental port 71, which at this time, is covered by the valve, such port, serving merely as an inflow port on the out-stroke, and being covered on the return-stroke and provides an atmospheric cushion within the cylinder. In other words I provide an inlet port 72 for the instroke of the piston 60ª, which port serves also as an outlet port on the outstroke of the piston, and separate inlet and outlet ports 71 and 73, for the out-stroke of the piston, such ports being closed respectively, by the valve against outflow and inflow.

*The glass-receiver.*—The glass-receiver comprises a ring block 10 removably mounted in a vertical perforation through the arm 9 of the cross-head 8, the size of the ring block being slightly less than the aperture in which it is contained, to permit it to assume alinement with coöperating parts, and to prevent sticking when heated. The cross-head 8 as a whole is guided for vertical movement on the guide standards 6, 6ª and is actuated for this vertical movement by being connected to the upper end of a piston rod 74, the lower end of which has a piston head 74ª thereon contained within the vertical air-cylinder 75 bolted to the machine base. From the opposite ends of the cylinder air-pipes 76, 76ª lead to a valve-chest 76ᵇ fastened to one of the guide standards, and containing a double-acting slide valve, the stem 76ᵈ of which is actuated by a cam drum 77 located on the vertical controlling shaft 67 before referred to, the construction being such that air is alternatively admitted above, and below, the piston head to raise and lower the piston rod 74. The lifting of the piston results in a lifting of the cross-head 8, and of the glass-receiving and glass severing mechanisms carried thereon, and the timing of the parts is such that when the machine is at rest and ready to receive a charge the cross-head is down the lower limit of its movement and the shears are opened.

Mounted on the top of the head 5 is the press cylinder 11 containing the vertically moving piston rod 78 and piston-head 78ª, and connected with a valve chest 79 by the pipes 79ª and 79ᵇ, such valve chest containing a slide valve which is controlled in its movement by the cam drum 80 mounted on the upper end of the controlling shaft 67, the position of this cam being such that when the machine is normally at rest the piston rod 78 is lifted to its upper limit of movement.

The lower end of the piston rod 78 carries a cup-shaped press plunger 81, which has an external diameter adapting it to slide snugly within the glass-receiver 10, and has an internal cavity of the size desired for the exterior of the finished blank. The cup 81 has a port 81ª therein extending from its outside to the top of the cavity, at which latter point is located a headed valve stem 81ᵇ, which by pressure of a spring 81ᶜ is forced down thus unsealing such port. Thus on the plunger descending upon the glass contained in the glass-receiver, the trapped air is allowed to escape through the port 81ª and the glass to fill the entire cavity. When this has taken place, the valve 81ᵇ is lifted by the glass and the aperture closed, thus preventing the clogging of the same by glass extruding therein. The pressure on the press-plunger is ample to force the glass to make a perfect blank of the desired contour.

The above constitutes the non-translatory elements of the machine, and a complete machine comprises one each of such elements. With them are associated certain translatory elements which may vary in number, such translatory elements comprising the glass-carrying spindles, the blowing mechanisms, the mold mechanisms and the neckers, and all of which are mounted upon the unit carriers rotating around the central axis of the machine.

*The unit carriers and their translating mechanism.*—Each unit-carrier 22, as before stated, comprises a middle portion which, for strength, is of I section, and which has bolted to its upper and lower ends, inclined members 22ᵇ, 22ᶜ, the inner ends of which are formed into bearings mounted upon the upper and lower columns, 2 and 4. Each of the carriers is intermittently driven around such column by the engagement of the driving dog 25 carried thereon with teeth 21ᵇ of the constantly rotating ratchet wheel 21. The dog is however adapted to be lifted out of the ratchet teeth by means of the tappet arm 26 on the shaft 24 striking, in the travel of the carrier, stop pins 82, 82ª, 82ᵇ projecting upwardly from the base of the machine. These pins are located at certain angular positions where it is desired that the carriers may be arrested. In the machine shown, these positions are loading, *i. e.*, that position in which the glass-receiver is in coöperative relation with the glass-receiving and pressing mechanism; the position of elongation, and a position of unloading. Each of these pins is adapted to be retracted out of the path of the tappet arm 26, whereupon the spring pressed rod 27 behind the dog, forces the dog into the engagement with the ratchet teeth. The pin 82 which arrests the carrier at the loading position has its lower end connected with one arm of a double crank shaft 83 mounted below the base of the machine, the other arm of which projects upwardly and is connected by a link 83ª, to the tail of a lever 83ᵇ, the nose of which is located adjacent to the notched disk 70 on the controlling shaft 67. Such disk carries a stud 84, adapted on the rotation of such shaft, and after the cross-head-air-cylinder valve 76ᵈ has been actuated to cause the lifting of such cross head, and of the glass-receiver 10 to strike such lever, and to thus oscillate the crank shaft 83 and withdraw the pin 82. Under these conditions, the dog upon the carrier at loading position will be thrown into engagement with the ratchet teeth of wheel 21, and the carrier will be set in motion. The travel will continue until the tappet arm 26 on the dog shaft strikes the elongation stop pin 82ª, when the carrier will be again arrested. This pin can be retracted by means of a foot lever 84 by an operator at the proper time (and which may be held retracted by a detent 84ª, if desired) and when such pin is so retracted the carrier again resumes movement to be again arrested by the unloading stop pin 82ᵇ, which may be retracted by a foot lever 85. Upon the depression of such foot-lever 85, the driving dog 25 again goes into mesh with a ratchet tooth in the wheel 21 and the carrier resumes its travel, and may then continue to travel until it is arrested by the loading stop pin. It may be, however, that the interval of loading is greater than the natural time rate of the machine, and that in this manner, one of the carriers may be in the loading position at the time the succeeding carrier approaches such position. To take care of this condition, each carrier has projecting from the rearward side thereof, a finger 86 which is adapted to contact with the tappet arm 26, upon any carrier which approaches too closely to the rear thereof, and by oscillating the dog shaft disengage the driving dog 24 of such following carrier, from the driving ratchet and thus arrest the movement of such succeeding carrier until the carrier in advance thereof has again moved forward. In this way, the unit carriers are each independently movable around the central axis and each at its own rate and may be independently and at will started and stopped in their travel, while if one unit carrier overtakes at any point in the path of travel by reason of this stoppage a carrier in front, thereof, it will be automatically arrested until such time as the front carrier moves forward.

*The glass spindle.*—In the description of this part of the machine, the terms "upper" and "lower," and "top" and "bottom," will be used with reference to the position the parts assume at the loading and the term "erect" will be used to designate the loading position of the spindle although during certain steps in the operation of the machine the glass carrying spindle is inverted.

The main sleeve 37 of the carrier is mounted in the transverse bore formed in the cross-head 30, being held therein by a shoulder 37ª, on one side of the cross-head, and by lock nuts 37ᵇ, upon the other, and contains a bushing 87. The lower end of the sleeve 37 is internally threaded, and receives a double nut 89 between the top of which and the bushing is interposed a hollow spacer 90ª, packing 90ᵇ being interposed between the spreader and the nut, and the spreader and the bushing. Within the upper end of the sleeve 37 is contained a follower ring 91 normally pressed outwardly against a limiting shoulder 91ª on the sleeve 37 by a spring 91ᵇ, which spring is within the sleeve and held under tension between the bushing and the lower part of such ring. The longitudinal adjustment of the bushing in the sleeve by means of the nut 89 and spacer 90ª, affords means for adjusting the strength of this spring. Located within the sleeve, and projecting through the central apertures of the double nut 89, the spacer 90ª and the ring 91, is contained the air tube 92, which has its lower end threaded to engage the internal thread in the nut 89, by which it is locked in place. By turning the tube within the nut, the former may shift axially within the bushing.

Located within the tube 92 is the plunger 93 having on its upper end and projecting beyond the tube a domed head 94 of proper shape to give the desired configuration to the internal cavity of the blank. By preference, this head is made removable in order to accommodate machines to different styles of blanks. The lower portion of the plunger is formed by a reduced stem 93ª which projects through a packed cap 92ª on the lower end of the tube 92, such stem having a collar 93ᵇ thereon, and located between this collar, and a pin 95 contained within the tube and passing through a vertical slot in the stem, is a spring 95ª, which has for its purpose retracting or withdrawing the plunger.

The spindle sleeve 37 has, as before stated, fast thereon, the beveled gear wheel 38, by which such spindle is rotated. Diametrically opposite each other and projecting upwardly from the upper face of the gear 38 are upstanding ears 96, having shoulders 96ª formed at their upper ends. Intermediate of these shoulders and the beveled gear, the upstanding ears are tapped as at 96ᵇ to receive screw-pins 96ᶜ which form the pivotal axes for the opening and closing movement of the neck ring.

The neck ring carrier 97 consists of two halves, each half having depending from the lower surface thereof, a bifurcated leg 97ª, the major axis of which is parallel to the line of division of the carrier, and is of sufficient length to fit between the upstanding ears 96 on the top surface of the gears 38, and to be pivoted to such ears by the pins 96ᶜ, thereby forming pivotal bearings for the neck ring. Each bifurcated leg is further provided with fingers 97ᵇ projecting outwardly therefrom.

Surrounding the upstanding ears 96, which have their corners finished to a radius from the center of the gear, and also surrounding the legs 97ª, and guided thereby, is the actuating collar 98, which is located above the fingers 97ᵇ, so that upon the downward movement of such collar which will depress the ends of the fingers 97ᵇ, the neck ring carrier is opened by movements of its parts on the pivot pins 96ᶜ, while on an upward movement of the collar, the upper edge thereof strikes the beveled faces 97ᶜ formed upon the lower side of the neck ring carrier, and thus forces the latter closed, in which position it will be held by the continued upward movement of the collar, which is of sufficient internal diameter to pass around the outside of the neck ring carrier. For the purpose of causing this movement of the collar it has an annular groove upon its periphery in which are contained blocks 98ª, mounted upon the upper end of links 98ᵇ. The lower end of these links are pivoted to a yoke handle 98ᶜ pivoted upon a bracket 98ᵈ carried by the cross head 30 so that by shifting the handle up and down, the neck ring may be closed and opened. Reference is here made to Figs. 14 and 15, which shows the spindle in an inverted position.

Seated within the neck ring carrier is the neck ring 98ᵉ, this also being made in two parts, divided in same plane as the neck ring carrier, one of the parts of the neck ring being removably secured to the corresponding part of the carrier in any suitable manner. The neck ring is so mounted that when its parts are closed it surrounds and projects above the upper part of follower ring 91, arising from the top of the sleeve 37, and so that when the spindle is erect and the carrier upon which it is mounted in loading position, and the cross head 8 is down, the upper end of the neck ring is sealed against the lower surface of the arm 9, the upper outer edge of the ring being beveled to make a close joint therewith. An internal flange 98ᶠ is formed at the top of the ring slightly above the top of the follower 91. Thus the upper part of the neck ring forms a downward continuation of the glass receiving cavity and the bottom of such cavity is formed by the spindle parts.

Mounted on a support 99ª arising from the cylinder 75, and between the guide standards 6, 6ª is a lever 99, the inner end of which projects beneath the stem 93 of each unit when such unit is in loading position, and in coöperative relation with the forming mechanism, while its outer end is located in the path of movement of a tappet roller 99ᵇ mounted on the piston rod 74, the position of the parts being such that upon the descent of the rod to lower the cross-head 8 into coöperative relation with the spindle, the inner end of the lever 99 will be lifted, thereby lifting the plunger against the pressure of its retracting spring 95ª, and throwing its forming end 94 up into the glass-receiver, where it will be held positively against pressure exerted upon such glass by the external press plunger 81, by reason of the fact that the tappet roller 99ᵇ will pass in front of the forward end of the lever 99 and lock it in such position, until the rod again rises when the cross head is again raised. As soon, however, as the cross-head is raised the spring of the internal plunger retracts the head 94 and leaves the blank in the neck ring with an internal cavity therein.

*The necker.*—Pivoted on a bracket 100 on the side of the central section 22ª of each unit is a lever 100ª, the inner of which is bent downwardly and toward the rear, terminating adjacent to the main cam drum 3, which is provided with an adjustable striker 100ᵍ (see Fig. 4), adapted to throw the lever against the tension of spring 100ᶜ. The outer end of the lever preferably carries a carbon block 100ᵇ which is brought up against the blank close to the part thereof held by the neck ring during a part of the time the carrying spindle is inverted. To provide easy adjustment for the operative positions of the block 100ᵇ, I prefer as shown to make the lever 100 in two parts, pivoted together at 100ᵉ, and provided with means such as the screw 100ᶠ whereby the two parts thereof may be held in desired angular relation with each other.

*Air.*—Two sources of air supply are employed, the one for producing the preliminary puff or expansion of the blank and the other for the final blowing of the blank in the mold. The puff air for each unit is derived from an air pump cylinder 101 carried on the side of the central section of the carrier of the unit, and containing a piston 102 actuated by a slide 103 guided in bearings on the base of such section. The lower end of the slide carries a roller 103ª running upon a vertically adjustable cam track 104 on the inside of the circumferential wall 104ª arising from the base. This cam track is adjustable vertically to provide for variation in the timing of the piston movements and the connection between the slide rod and the piston is made through a slotted link 105, to which the lower end of the piston is pivoted and having a slot 105ª therein, by which the upper end of the connecting rod 106 may be adjustably clamped thereto, the lower end of such connecting rod being pivoted to the upper end of the slide. The opposite end of the link receives the pivoting pin 105ᵇ on the central section 22 of the carrier to permit the angular movement of the link and to maintain the piston in its right line of movement. The upper end of the cylinder communicates by a pipe 107 and a channel 107ª (see Fig. 22) with the interior of the trunnion bearing of the glass carrier, and such trunnion is axially and radially bored as at 107ᵇ to permit the passage of air into such trunnion and forwardly through the same to the bore of the cross-head, which is grooved as at 107ᶜ. The main sleeve of the glass carrier is fenestrated at 108ᵈ, to register with such last named groove, and thus the air pressure caused by the puff cylinder is transmitted to the interior of such sleeve. From this point the air passes through perforations 108ᵉ, 108ᶠ, formed in the inner tube and the spreader 90ª, to the inside of the latter, and flows up between the inner wall of such tube and the body of the internal plunger, (which latter is made sufficiently small for this purpose,) and through the upper end of the tube and around the plunger head.

The head 94 of the internal plunger is slightly enlarged over the body thereof, and makes a close fit in the upper end of the tube 92 so that when the head 94 is projected outwardly, the passage of air is prevented. This is, however, only a safe-guard against pressure within the air system due to heating, and to prevent the sealing of the tube by glass projected between such tube and the internal plunger. To permit the outflow of air when the internal plunger is retracted, the tube 92 has a series of grooves immediately below its upper end, and in this portion of the tube the head of the plunger is located when retracted.

The capacity of the puff cylinder is sufficiently great to eject upon a single inward stroke, the amount of air necessary for puffing a blank.

The upper central standard 4 at each of the bearings formed therein for the upper sections 22ᵇ of the unit carriers, is perforated as at 109 and the upper end of such standard is closed by a plate 110, through which passes an air induction pipe 111, provided with a reducing valve 112. The pipe 111 is connected with the main air pipe 113, to which may be also connected the various air supply pipes before referred to, excluding of course the puff air. The lower end of the upper standard 4 is closed by the plate 114, the two plates 110 and 114 being drawn on their seats by the bolt 115. Thus the upper standard 4 contains air under pressure. Each of the collars formed on the upper end of the sections 22ᵇ of the unit carriers is annularly grooved opposite the corresponding perforations 109 in the standard, and communicating with such groove, is bored as at 116. From the bore 116, an air pipe 116ª leads to the air valve chest 117 carried by the central section of each carrier adjacent to the spindle trunnion and communicating with the channel 107ª through which puffed air is admitted by means of a restricted passage governed by a needle valve 118. The stem of the valve 118 carries a crank arm 119 angularly adjustable thereon. The crank arm adjustably carries a block 120 connected to lower end of a connecting rod 121 which is pivoted to one end of a lever 122 pivotally mounted on the unit carrier. The other end of the lever carries a roller 123 adapted to run upon the lower surface of an adjustable cam track 124 carried from a spider frame 125 fast upon the upper central standard 4. The throw of the valve stem is adjusted by moving the block 120 on the lower end of the connecting rod lengthwise of the crank arm 119 and this can be done by a screw carried by such arm and working in such block.

This mechanism which is to provide air for the final blowing can be replaced if desired by a displacement pump mounted on each unit, whose piston is actuated in a predetermined manner, by the travel of the unit. This means of obtaining blown air which is of the type shown in British Patent No. 21611 of 1912, is advantageous among other reasons in that it does away with sliding air connections.

*The mold mechanism.*—The mechanism for lifting the molds by rotating the mold carrying shaft 51 has been described. Each of the mold parts 52 is pivoted by a pin 127 carried by the shaft 51, at right angles thereto, and these parts are connected by links 128 to one end of a lever 129, sleeved on a shaft 130 parallel with the pin 127 and mounted in a bracket 130ª carried on the shaft 51. The shaft 130 has fast on its upper end a head 131, provided with an ear 132 adapted to contact with a lug 133 on the lever 129 to one side of the shaft 130, the other end of the head terminating in a finger 134, between which and a corresponding finger 133ª on the other end of the lever 129 is contained a spring 135, the arrangement being such that in turning the shaft 130 in one direction, the ear 132 will contact with the lug 133 and swing the lever 129 to open the mold part around the pivot pin 127. On a reverse motion of the shaft 130 the reverse motion will be given to the lever 129, through the spring 135 to close the mold parts. The lower end of the shaft 130 has a crank arm 136, thereon, carrying a roller 137 which by running up a cam track 138 carried from the base 1 of the machine is adapted to close the molds. A spring 139 connected to the mold parts at the point of connection of the links 128 hold the mold parts normally opened.

*Operation.*

In the following description the parts will be presumed to be initially in the position they occupy when the machine is entirely empty and is at rest. In this position all of the units will be bunched as shown in Fig. 26, one of the units (which will be designated as #1) being in the loading position and the other units crowded up against it. The drawing dog 25 of the #1 is at this time held out of the driving ratchet teeth 21ᵇ by the loading stop pin and the dogs of the other units are also held out of the said teeth, either by the finger 86 of the preceding units, or as may be the case of unit #3, by the unloading stop pin. The spindles of several of the units are not rotating and occupy various positions of inclination, the spindle of the unit in loading position being erect. The molds of several of the units are open and of one or more of the units immersed in the water in the cooling pan. The internal plunger 93 of all the units except unit #1 are retracted, the air valves 118 of all the units except unit #4 closed, and the piston of the puff cylinder 101 of unit #1 is at the lower end of its stroke. The shears 61, 61ª are opened, the external press plunger 81 is raised, the head 8 lowered and the glass receiver 10 thereon seated upon the end of the neck ring 98 carried by the glass spindle of unit #1, and the plunger of the #1 unit is at this time held up by means of the roller 99ᵇ upon the rod 74. The controlling shaft 67 is in such position that the controlling disk 70 thereon is arrested by the bolt 70ᵇ as shown in Fig. 7. The position of certain points is shown at this time in Fig. 27ª.

A stream of glass is now caused to flow into the glass receiver, either from a pontil or from any suitable source, and the operator, when a sufficient quantity of glass has been fed into the receiver, depresses the pedal 70ᵈ, thereby retracting the bolt 70ᵇ and permitting the controlling shaft 67 to be driven through its friction clutch 68, 68ª. The initial rotation of the shaft shifts, by means of the cam 66, the valve of the shear actuated cylinder and causes the blades of the shears to be projected across the axis of the receiver and to close upon the stream of glass as shown in Fig. 27ᵇ. As stated they close with such velocity that they not only sever the stream, but that the blunt cutting edge of the lower blade strikes the upper end of the severed stream before it has time to fall away from such blade and during its momentary contact therewith throws such end to one side of the vertical plane in which it was severed and thus causes such end to fall, not in the center of the glass receiver, but to one side thereof, the location of the severed end being shown dotted in said figure.

During the subsequent part of the rotation of the controlling shaft 67 the stem of the valve for the shear actuating cylinder will be shifted back to its original position and the shears again withdrawn and opened, while the continued rotation of the same shaft causes the upper cam drum 80 to shift the valve 79 of the press cylinder, and thereby causes a downward movement of the external plunger 81 mounted on the lower end of the piston rod 78, whereupon the blank will be pressed into the desired form. The construction of this air valve 79 is such that it causes an initial admission of air under pressure causing a downward movement of the piston and the external plunger until the latter is in close proximity to the glass within the receiver when further movement of the air valve 79 by the cam 80 causes an increased pressure of air to enter the press cylinder 11, thereby causing a further downward movement of the piston under greater pressure than the initial one. It is during this last admission that the glass within the receiver is pressed into the desired form. It will be noted that the external plunger enters the glass receiver as shown and that the exterior of the blank is formed entirely by the cavity of the external plunger and that air trapped in such cavity at such time escapes through the port 81$^a$, the valve 81$^b$ of which is lifted by the glass at the final pressing to prevent escape of glass therethrough.

Inasmuch as it is an impossibility to accurately gage the amount of glass to be placed in the glass receiver in actual operation various amounts are severed and loaded into the machine. In the production of the finer grade of articles such as this machine is especially adapted to make it is necessary to have approximately the same amount of glass enter into the completion of the finished article. An overcharge of glass is taken care of by the spring supported follower ring 91. Upon the descent of the plunger any excess of the volume of glass over that necessary to fill the cavity thereof is pressed down between the head of the tube 92 and the neck ring 98, the spring 91$^b$ being of sufficient strength not to yield to permitting the consequent descent of the ring 91 until the pressure on the glass reaches a predetermined amount, which pressure is sufficient to cause the glass to properly flow to fill the cavity in the external plunger. This also results in a flow of glass beneath the internal flange of the neck ring. The pressure necessary to cause the glass to depress the ring 91 may be regulated by axially shifting the tube 92 and thus varying the space at the mouth of the neck ring through which the glass must be pressed. This space forms an adjustable throat. The position of the parts at this time is shown in Fig. 27$^c$.

Due to the shape of the cavity of the plunger 81, the pressure is first brought to bear upon the top of the body of glass in the receiver around the edges thereof and the glass located there (thus including the severed end of the cut) is forced inwardly into the body of the blank to be formed, where it quickly absorbs heat from its surrounding. Its top being reduced in diameter by this operation, the blank is caused to elongate, and its central part to flow upwardly into the cavity of the plunger, where as before stated it lifts the air escape valve.

Further rotation of the controlling shaft 67 now reverses the valve connections of the press cylinder 11, and the cross head lifting cylinder 75 (admitting air to the lower ends of such cylinders), whereupon the press plunger 81 is raised, and the cross head 8 goes up, leaving the blank on the neck ring as is shown in Fig. 27$^d$. It will be noted that the spring 91$^b$ presses the collar formed on the blank against the flange 98$^a$ of the neck ring thus firmly holding the blank on the spindle for subsequent treatment. At this time also the rod 90 is pressed down by the spring 90$^b$.

The pressure to which the glass has now been submitted has formed it into a homogeneous blank, the walls of which have been sufficiently chilled by contact with the metal parts to form a sack to contain the still fluid interior. The period during which the glass is in contact with the receiver and plunger should not however be so great as to so chill the surfaces in contact therewith as to preclude their subsequent reheating by conduction from the interior of the blank sufficiently to permit its stretching without rupture in the subsequent processes of swelling. It also results in the chilling of the glass in the base of the blank within the neck ring to such an extent that it will not flow under the pressure of the spring pressed follower.

The continued rotation of the controlling shaft 67 after the external plunger and the cross head 8 are raised, causes the pin 84 on the disk 70 thereon to contact with the nose of the lever 83$^b$ connected to the stop pin 82 for the loading position and to depress such pin. The depression of this pin withdraws it from the path of the arm 26 on the dog shaft 24 of unit #1 and permits the spring pressed rod 27 to throw the driving dog 25 into engagement with the ratchet 21$^b$ of the constantly moving wheel 21, whereupon such carrier will move in unison with such wheel around the central standard of the machine and be thus removed from its loading position. The shaft 67 continues its rotation until it is arrested by the bolt 70$^c$, at which time it will have nearly completed a full revolution.

Coincident with the commencement of the translatory movement of the unit carrier, the roller 48 mounted on the push shaft 47 reaches a low portion of the cam run 49, thereby permitting the engagement of the two members of the friction clutch 41, 46 and thereby causing through the gears 44, 43, 41, 40, 39, and 38, a rotation of the glass carrying spindle about its longitudinal axis in the cross head 30 of the trunnion 29. The glass blank is now being carried as shown in Fig. 27$^e$, in the position in which it was formed (i. e. erect) on the top of the revolving spindle and free from the plunger and glass receiver. During this period the surface of the blank which is to form surfaces of the finished articles is free from heating conducting contact and the blank settles down somewhat, under the influence of gravity, relieving its internal strains. The settlement however, does not increase the surface area of the blank, and the surface heats by conduction from the hot interior of the blank, the rate at which heat is imparted thereto being in excess of the rate of loss to the surrounding air.

Further travel of the carrier causes the puffing air cam 104 to start lifting the puffing piston and to force air into the blank through the glass-carrying spindle, which at this time is in rotation in its bearing in the cross-head. It will be noted that between the removal of the blank from the forming mechanism (i. e. the external and internal plunger) and the commencement of the swelling of the blank by air there is, in the machine here described an appreciable interval. In practice this interval is so fixed that while it is not long enough to cause the blank as a whole to get so cold as to prevent its proper working without heating from an external source, it is long enough to permit the skin or surface of the glass which was more or less chilled by contact with metal parts reheating by conduction from the interior of the blank. This interval between removing the blank from the mold and any attempts to increase the surface area thereof is of greatest importance and as I believe necessary in preventing "optical streaks" in the finished article, and the reheating should be allowed to continue until the skin has been rendered so plastic as to stretch without splitting in the subsequent swelling of the blank.

About coincident with the introduction of the puff air the continued translatory movement of the carrier causes, through the cam run 36, rack 33, and gear 32, an angular movement of the spindle trunnion 29 to position the spindle horizontally as shown in Fig. 27$^f$. The spindle is maintained or retarded in its movement in about this position for an interval sufficient to permit the heat contained in the blank to be equalized therein and to permit a swelling of the blank by the puff air. This swelling, due to the horizontal position of the axis of the blank and the rotation of the blank about such axis, is unaffected by gravity and as the distribution of the swelling is controlled by the thickness of the walls of the blank at various points, the swelling is obviously controllable by varying the contour of the internal and external plungers.

Further translatory movement of the unit carrier now swings the glass on its horizontal pivot by the trunnion to an inverted position with the neck ring down. When the spindle has been inverted the tail of the lever 100$^a$ runs up the striker 100$^b$, and the carbon edge of the necker is pressed against the blank close beneath the neck-ring, reducing the diameter of the blank at the point (see Fig. 27$^g$). The point at which the necker is applied is at the glass which is to form the neck of the bulb and the reduction of diameter of the blank at this place facilitates the flow of glass there and localizes the elongation. The continued travel of the unit withdraws the necker, and causes a separation of the clutch members 41 and 46, and the rotation of the spindle stops, and the blank in hanging from the spindle elongates (see Fig. 27$^h$). The movement of carrier continues until carrier reaches the position of the elongation pin 82$^a$ and at this time the introduction of puff air is discontinued. If at this time the blank has not sufficiently elongated the unit carrier can be arrested by the operator releasing the lever 84 and permitting the pin to rise in position to contact with the tappet arm on the dog shaft 24. If sufficient elongation has taken place the carrier need not be arrested. It is again put in motion after proper elongation, by depressing the pin 82$^a$, and as it moves forward the friction clutch 41, 46 is again engaged and the rotation of the spindle resumed. In this travel of the unit carrier, the mold, which has been raised by means of the cam run 54, closes around the elongated blank, this being effected by the closing cam run 138. Upon the closing of the molds the air valve 118 is opened and blowing air admitted to swell the blank to the desired form (see Fig. 27$^i$) the piston of the puff air cylinder being held at this time at the end of its work stroke. Upon the termination of the blowing, the air valve is again closed, the mold opened and lowered, and the spindle is slightly swung upon its trunnion bearing back toward its normal erect position (see Fig. 27$^j$) at which time the carrier is arrested in its travel by the unloading stop pin 82$^b$ withdrawing the dog from the ratchet of the wheel 21 and the rotation of the spindle stopped by the disengagement of the clutch members 41, 46.

The blown article is now removed by the operator by swinging the handle by which the neck ring carrier parts are separated. The actuating lever 85 of the unloading pin may be now depressed, and the driving dog upon the carrier again engaged with the ratchet teeth of the wheel 21 to continue the translatory movement of the carrier toward loading position to complete its cycle or to be arrested before reaching loading position by running up on the unit ahead of it.

It will be remembered as above stated, the four unit-carriers were assembled closely together, unit #1 whose movements we have followed being at loading position and the other unit being immediately in the rear thereof with the projection 86 on each unit engaging the tappet arm 26 mounted on the base of the vertical dog shaft 24 of the unit which follows it and is immediately against it.

The initial movement of each unit carrier from loading position after the blank has been formed thereon by the pressing mechanism causes the tail 86 on such unit carrier to withdraw from engagement with the tappet arm of the dog shaft 24 on the carrier immediately following it. This disengagement causes the second unit to move forward by permitting the dog to engage the driving ratchet teeth and in a like manner this will effect the following units. Thus the units move forward until arrested by the stoppage of the second unit in loading position by the engagement of the loading stop pin 82 with the arm 26 of the second unit. In this movement of the second unit to loading position the glass spindle therein is moved to its normal erect position.

Immediately before each unit is moved into loading position the beveled lug 70$^m$ thereon depresses the push rod 70$^k$ and retracts the bolt 70$^e$ from the notch 70$^a$ in the disk 70, which permits the shaft 67 to resume its rotation toward normal position. In this rotation the cam drum 77 shifts the valve of the cross head lifting cylinder 75 and causes the descent of the cross head to seat the glass receiver on the end of the neck ring.

In order to prevent as much as possible all conduction of heat from the blank, the neck ring may be insulated with carbon or asbestos (see 98$^h$ Fig. 13), and an insulated top 91$^g$ may be placed on the end of the follower ring.

Having thus described my invention what I claim is:

1. In a glass working machine, the combination with a preforming mechanism, of a plurality of glass working units co-acting therewith, a motor, a driving connection between each unit and the motor for causing travel of the units in a closed path and into successive coöperative relation with the preforming mechanism, and means for disengaging such connections for each unit when such unit comes into coöperative relation with the preforming mechanism.

2. In a glass working machine, the combination with a preforming mechanism, of a plurality of carriers, a motor, a glass working spindle carried by each carrier, a connection between each carrier and the motor for causing such carrier to move in a closed path, automatic means for separately disengaging the connections of the several units when each unit is in position to bring the spindle thereon in coöperative position with the preforming mechanism, and means for restoring such connection at will.

3. In a glass working machine, the combination with a preforming mechanism, of a plurality of glass working units coacting therewith, a motor, a driving connection between each unit and the motor for causing travel of the units in a closed path and into successive coöperative relation with the preforming mechanism, means for disengaging the connection for each unit when such unit comes into coöperative relation with the preforming mechanism, and means controlled by the preforming mechanism for reëngaging such connection.

4. In a glass working machine, the combination with a preforming mechanism, of a plurality of glass working units coacting therewith, a motor, a driving connection between each unit and the motor for causing travel of the units in a closed path and into successive coöperative relation with the preforming mechanism, and means for disengaging such connection for each unit when such unit comes into coöperative relation with the preforming mechanism, and upon such unit assuming a given position in respect to the preceding unit.

5. In a glass working machine, the combination with preforming mechanism, of a series of glass working units, coacting therewith, a motor, a driving connection between each unit and the motor for causing travel of the units in a closed path and into successive coöperative relation with the preforming mechanism, means under the control of the operator for independently arresting each of such units at another position in its path and means for arresting each unit upon approaching a preceding unit.

6. In a glass working machine, the combination with a preforming mechanism, of a plurality of glass working units coacting therewith, a motor, a driving connection between each unit and the motor for causing travel of the units in a closed path and into successive coöperative relation with the preforming mechanism, means for disengaging such connection for each unit when such unit comes into coöperative relation with the preforming mechanism, means for disengaging such connection and upon such unit assuming a given position in respect to the preceding unit, and for reëngaging such connection upon the forward movement of the preceding unit.

7. In a glass working machine the combination with a preforming mechanism, of a plurality of glass working units coacting therewith, a motor, a driving connection between each unit and the motor for causing travel of such units in a closed path and to bring them successively into coöperative relation with the preforming mechanism, means for automatically disengaging such connection for each unit when such unit comes into coöperative relation with the preforming mechanism, and upon such unit assuming a given position in respect to the preceding unit and means, under the control of the operator, for reëngaging the connection between each unit and the motor when the former is in coöperative relation with the preforming mechanism.

8. In a glass severing mechanism, the combination with a pair of cutting members, the lower one of which has a blunt cutting edge, of means for closing the members upon each other at such a speed that the upper end of the flow of glass severed thereby is momentarily carried along with such edge and is thrown thereby out of its vertical line of fall.

9. In a glass severing mechanism, the combination with a glass receptacle, of a pair of cutting members, the lower of which has a blunt cutting edge, and means for moving the last named member above the receptacle and in respect thereto with such velocity that the upper end of the flow of glass severed thereby is thrown by such edge to one side of the receptacle.

10. The hereinbefore described process of severing glass which consists in cutting it with a blunt edge having a horizontal velocity so great that it remains in contact with the severed glass to throw the end of such glass out of the line of flow of the bulk of the glass.

11. In a glass forming machine, the combination with a glass receiver, of a pressing plunger having a concave recess therein and having an air relief port leading from the end of such recess, and a valve located at the end of said port and lifted by the flow of glass caused by the plunger to close such port.

12. In a glass forming machine, the combination with a glass receiver, of a cup shaped plunger entering the receiver and forming the exterior of all the portion of the blank which is to form the finished article.

13. In a device of the character described, the combination with a glass receiver, of a shear adapted to sever glass flowing therein and to deposit the severed end to one side of center of the receiver, and a plunger having a cup shaped pressing cavity adapted to enter the receiver and to press the severed end laterally into the interior of the glass.

14. The hereinbefore described process of suppressing shear marks in severed glass, which consists in severing glass and in then pressing the glass by faces which cause an internal flow and distribution of the severed end in the interior of the pressed blank.

15. The hereinbefore described process of suppressing shear marks in severed glass which consists in so severing the glass that the severed end is deposited to one side of the center of the severed mass, and in then elongating the blank by pressure placed upon its end adjacent to its periphery whereby the severed end is caused to flow into the interior of the mass of the blank.

16. The hereinbefore described process of suppressing shear marks which consists in depositing the severed end of the blank to one side of axial center thereof and in then extending the blank axially by pressure applied around such axial center.

17. In a glass working machine, the combination with a glass receiver, of a neck mold and plunger forming a removable base for such receiver, a press plunger working within such receiver, and a receding follower surrounding the plunger and inclosed with the neck mold and yielding upon the pressing in the receiver of an excessive charge of glass.

18. In a device of the character described, the combination with a glass receiver, of a press plunger adapted to enter such receiver, a glass carrier adapted to form the base of such receiver and including a neck mold, a receding follower mounted within the neck mold, an air tube contained within the follower, and a plunger contained within such tube.

19. In a glass-forming mechanism, the combination of a glass-receiver and a receding follower forming a glass-receiving cavity open at one end, the cavity having a restricted adjustable throat between its open end and the follower.

20. In a glass-forming mechanism, the combination of a glass-receiver and a receding follower forming a glass-receiving cavity open at one end, the cavity having a restricted adjustable throat between its open end and the follower, and a plunger adapted to enter the open end of the cavity.

21. In a glass-forming mechanism, the combination with a glass receiver, of a neck-ring located at one end thereof, a tube adjustable within the neck-ring axially thereof and forming therewith an adjustable throat, a plunger reciprocable through the tube, a resiliently mounted follower between the neck-ring and tube, and a plunger adapted to enter the receiver from the opposite end thereof.

22. In a glass working machine, the combination with a glass receiver, a cup shaped plunger adapted to enter the upper end thereof, a neck mold adapted to register with the lower end of the receiver, and means for lifting the plunger and receiver to free the pressed blank therefrom.

23. In a glass working machine, the combination with a glass receiver, of glass severing mechanism adapted to cut glass fed to the receiver from above, a cup shaped plunger entering the receiver from above, a neck mold registering with the lower end of the receiver and means for lifting the glass receiver, leaving the pressed glass supported by its base in the neck ring.

24. In a glass working machine, the combination with a glass working spindle, of a neck ring having an internal annular flange mounted upon the spindle beyond the end thereof, a tube axially shiftable in the spindle to vary the distance between its end and the circular flange on the neck ring to form therewith an adjustable throat through which glass is pressed, and a plunger adapted to force glass therethrough.

25. In a device of the character described, the combination with an intermittently traveling support, of a glass carrying spindle mounted on such support for rotation upon its longitudinal axis, means for arresting travel of the support, and means for intermittently rotating the spindle and for arresting it independently of the arrest of travel of the support.

26. In a glass working machine the combination with a preforming mechanism, of a traveling carrier, a glass-working spindle mounted on such carrier for rotary movement on its longitudinal axis, means for arresting the carrier with the spindle thereon in coöperative position in respect to the preforming mechanism and for moving it from such position and means for arresting the rotation of the spindle while in such coöperative position and during a part of the time the carrier is in travel.

27. In a glass working machine, the combination with a spindle mounted for pivotal movement in a vertical plane and adapted to carry a mass of glass, of means for introducing puffing air into such blank, means for placing the spindle in a substantially horizontal position and for arresting it in this position while in rapid rotation around its longitudinal axis to swell the blank, and means for then completing the inversion of the spindle.

28. In a glass-working machine, the combination with a plurality of units, of means for driving such units in a closed path, means for separately arresting the individual units in certain angular positions in such paths, and means for arresting each unit when it approaches the preceding unit.

29. In a glass-working machine, the combination with a plurality of glass-working units, of a motor, a driving connection between each unit and the motor for causing travel of such units in a closed path, and means for disengaging such connection for each unit in a given position of such unit, and upon such unit assuming a given position in respect to the preceding unit.

30. In a glass-working machine, the combination with a plurality of glass-working units, of a motor, a driving connection between each unit and the motor for causing travel of such units in a closed path, means for separately arresting travel of the individual units for variable periods at will, and means for automatically disengaging the connection between each unit and the motor upon such unit assuming a given position in respect to the preceding unit.

31. In a glass-working machine, the combination with a plurality of units independently traveling in a closed path, of means for automatically arresting each unit at a given position in such path, means for advancing the units at will, means for arresting each unit upon approach to the preceding unit, and means for automatically advancing such unit upon the advance of the forward unit.

32. In a glass-working machine, the combination with a plurality of units, of a motor, a connection between each unit and the motor whereby the several units are caused to follow one another in a closed path, means for disengaging the said connection for variable periods, means whereby the connection for each unit is disconnected upon its approach to preceding units, and means for automatically re-connecting such connection upon the assumption of travel of the preceding unit.

In testimony whereof I have hereunto signed my name this 14th day of August, 1914.

ROBERT W. CANFIELD.

In the presence of—
G. WILLIS DRAKE,
FRED. C. CAMERON.